United States Patent
Ohno et al.

(10) Patent No.: US 10,369,661 B2
(45) Date of Patent: Aug. 6, 2019

(54) OPTICAL PROCESSING HEAD, OPTICAL MACHINING APPARATUS, AND OPTICAL PROCESSING METHOD

(71) Applicant: TECHNOLOGY RESEARCH ASSOCIATION FOR FUTURE ADDITIVE MANUFACTURING, Tokyo (JP)

(72) Inventors: Hiroshi Ohno, Yokohama (JP); Yuji Sasaki, Yokohama (JP); Mitsuo Sasaki, Yokohama (JP); Takashi Obara, Yokohama (JP); Kazuyuki Masukawa, Yokohama (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 0 days.

(21) Appl. No.: 14/889,088

(22) PCT Filed: Feb. 25, 2015

(86) PCT No.: PCT/JP2015/055483
§ 371 (c)(1),
(2) Date: Nov. 4, 2015

(87) PCT Pub. No.: WO2016/135906
PCT Pub. Date: Sep. 1, 2016

(65) Prior Publication Data
US 2016/0368097 A1 Dec. 22, 2016

(51) Int. Cl.
*B23K 26/342* (2014.01)
*B33Y 30/00* (2015.01)
(Continued)

(52) U.S. Cl.
CPC .......... *B23K 26/342* (2015.10); *B23K 26/064* (2015.10); *B23K 26/0648* (2013.01);
(Continued)

(58) Field of Classification Search
CPC .. B23K 26/342; B23K 26/064; B23K 26/144; B23K 26/702; B23K 26/0648;
(Continued)

(56) References Cited

U.S. PATENT DOCUMENTS 5,739,899 A * 4/1998 Nishi .................. A61K 38/395
355/53
6,596,613 B1 7/2003 Kusumoto et al.
(Continued)

FOREIGN PATENT DOCUMENTS

EP 2628564 A 8/2013
EP 2641688 A1 * 9/2013 ......... B23K 26/0652
(Continued)

OTHER PUBLICATIONS

International Search Report (ISR) dated Jun. 17, 2015 for International Application No. PCT/JP2015/055483.
(Continued)

*Primary Examiner* — Dana Ross
*Assistant Examiner* — Joseph M Baillargeon
(74) *Attorney, Agent, or Firm* — Ladas & Parry LLP

(57) ABSTRACT

An optical processing head capable of downsizing an apparatus while increasing the shaping accuracy of optical processing is disclosed. The optical processing head performs processing while moving, in a predetermined moving direction on a processing surface, an optical spot formed by condensing light emitted by a light source. The optical processing head includes an optical element that condenses light emitted by the light source to generate the optical spot of a shape elongated in the moving direction of the optical
(Continued)

spot. Part of the optical spot is set as a processing region, the front side and/or rear side of the processing region in the moving direction is set as a pre-heating region and/or post-heating region, and a processing target object before and/or after processing in the region is heated.

9 Claims, 11 Drawing Sheets

(51) Int. Cl.

| | | |
|---|---|---|
| *B33Y 50/02* | (2015.01) | |
| *B23K 26/064* | (2014.01) | |
| *B23K 26/144* | (2014.01) | |
| *B23K 26/70* | (2014.01) | |
| *B29C 64/153* | (2017.01) | |
| *B23K 26/06* | (2014.01) | |
| *B23K 26/073* | (2006.01) | |
| *B23K 26/08* | (2014.01) | |
| *B29C 67/00* | (2017.01) | |

(52) U.S. Cl.
CPC ...... *B23K 26/0736* (2013.01); *B23K 26/0869* (2013.01); *B23K 26/144* (2015.10); *B23K 26/702* (2015.10); *B29C 64/153* (2017.08); *B29C 67/00* (2013.01); *B33Y 30/00* (2014.12); *B33Y 50/02* (2014.12)

(58) Field of Classification Search
CPC ............ B23K 26/0736; B23K 26/0869; B23K 26/082; B33Y 30/00; B33Y 50/02; B29C 67/00; B29C 67/0077
USPC ......... 219/76.12, 78, 121.78–79, 121.78–80, 219/121.75; 359/849, 811
See application file for complete search history.

(56) References Cited

U.S. PATENT DOCUMENTS

| | | | | |
|---|---|---|---|---|
| 7,820,941 B2* | 10/2010 | Brown | ................... | B23K 26/06 219/121.67 |
| 8,053,705 B2 | 11/2011 | Shin | | |
| 2009/0071947 A1 | 3/2009 | Sekiguchi et al. | | |
| 2010/0078419 A1* | 4/2010 | Johansen | ............... | B23K 26/02 219/121.79 |
| 2013/0146572 A1* | 6/2013 | Watanabe | .......... | B23K 26/0648 219/121.72 |
| 2013/0270238 A1 | 10/2013 | Nawrodt et al. | | |
| 2014/0102146 A1 | 4/2014 | Saito et al. | | |

FOREIGN PATENT DOCUMENTS

| | | |
|---|---|---|
| JP | 58-154484 A | 9/1983 |
| JP | 63-145016 A | 6/1988 |
| JP | 7-124778 A | 5/1995 |
| JP | 8-213341 A | 8/1996 |
| JP | 8-257773 A | 10/1996 |
| JP | 2008-238209 A | 10/2008 |
| JP | 2009-72789 A | 4/2009 |
| JP | 2010-162583 A | 7/2010 |
| JP | 2 641 688 A1 | 9/2013 |
| JP | 2013-193110 A | 9/2013 |
| JP | 2014-139991 A | 7/2014 |
| JP | 2015-9504 A | 1/2015 |
| WO | 2012/172960 A1 | 12/2012 |

OTHER PUBLICATIONS

J-PlatPat English abstract of JP 2014-139991 A.
J-PlatPat English abstract of JP 8-213341 A.
J-PlatPat English abstract of JP 2015-9504 A.
J-PlatPat English abstract of JP 63-145016 A.
J-PlatPat English abstract of JP 2013-193110 A.
Extended European Search Report (ESR) dated Jan. 5, 2017 in connection with corresponding European Application No. 15784916.7.
J-PlatPat English abstract of JP 58-154484 A.
Japanese Office Action dated Jan. 17, 2017 in connection with corresponding Japanese Application No. 2016-510534, with English translation.
J-PlatPat English abstract of JP 2010-162583 A.
J-PlatPat English abstract of JP 2009-72789 A.
J-PlatPat English abstract of JP 2008-238209 A.
J-PlatPat English abstract of JP 8-257773 A.
J-PlatPat English abstract of JP 7-124778 A.

* cited by examiner

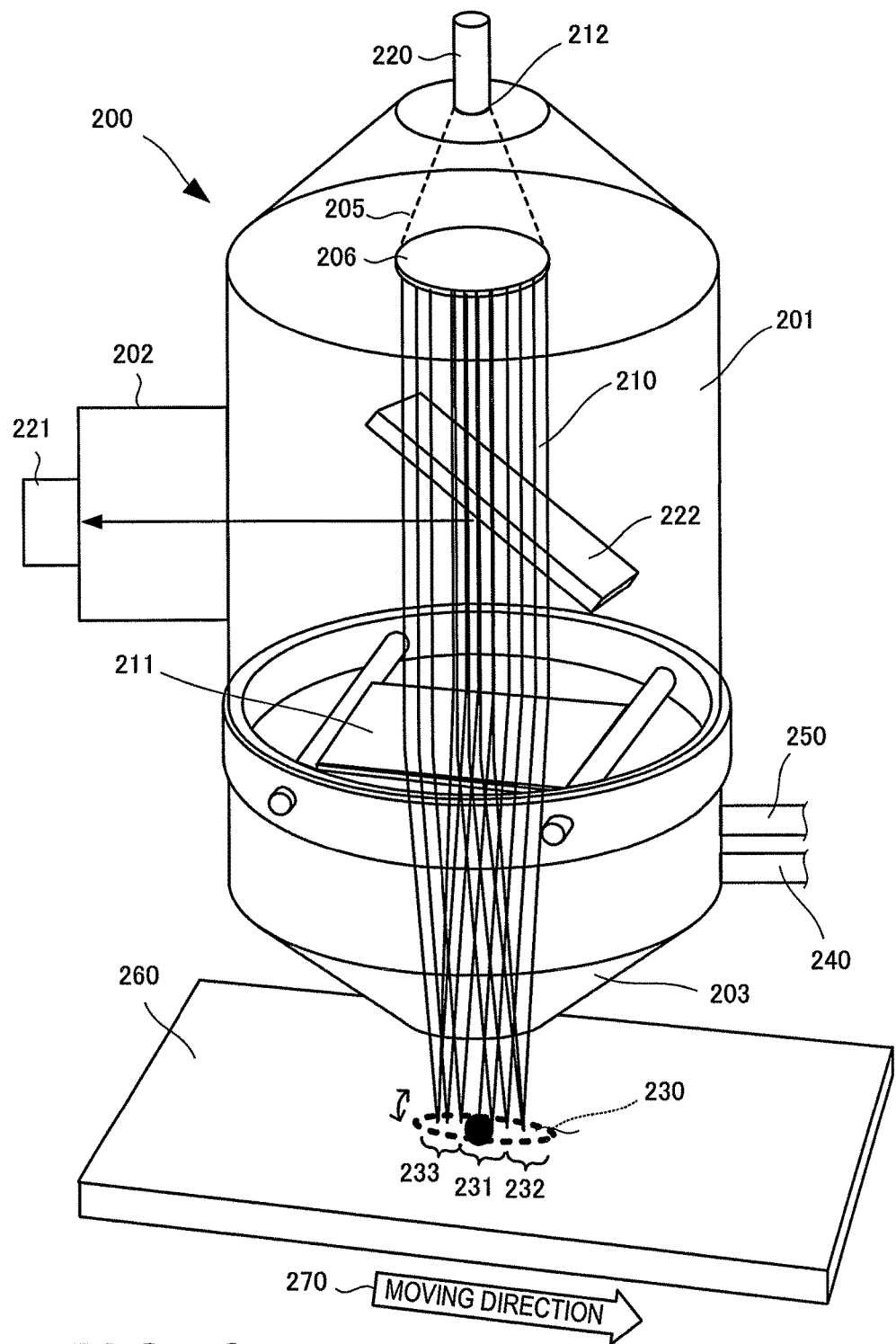
F I G. 2

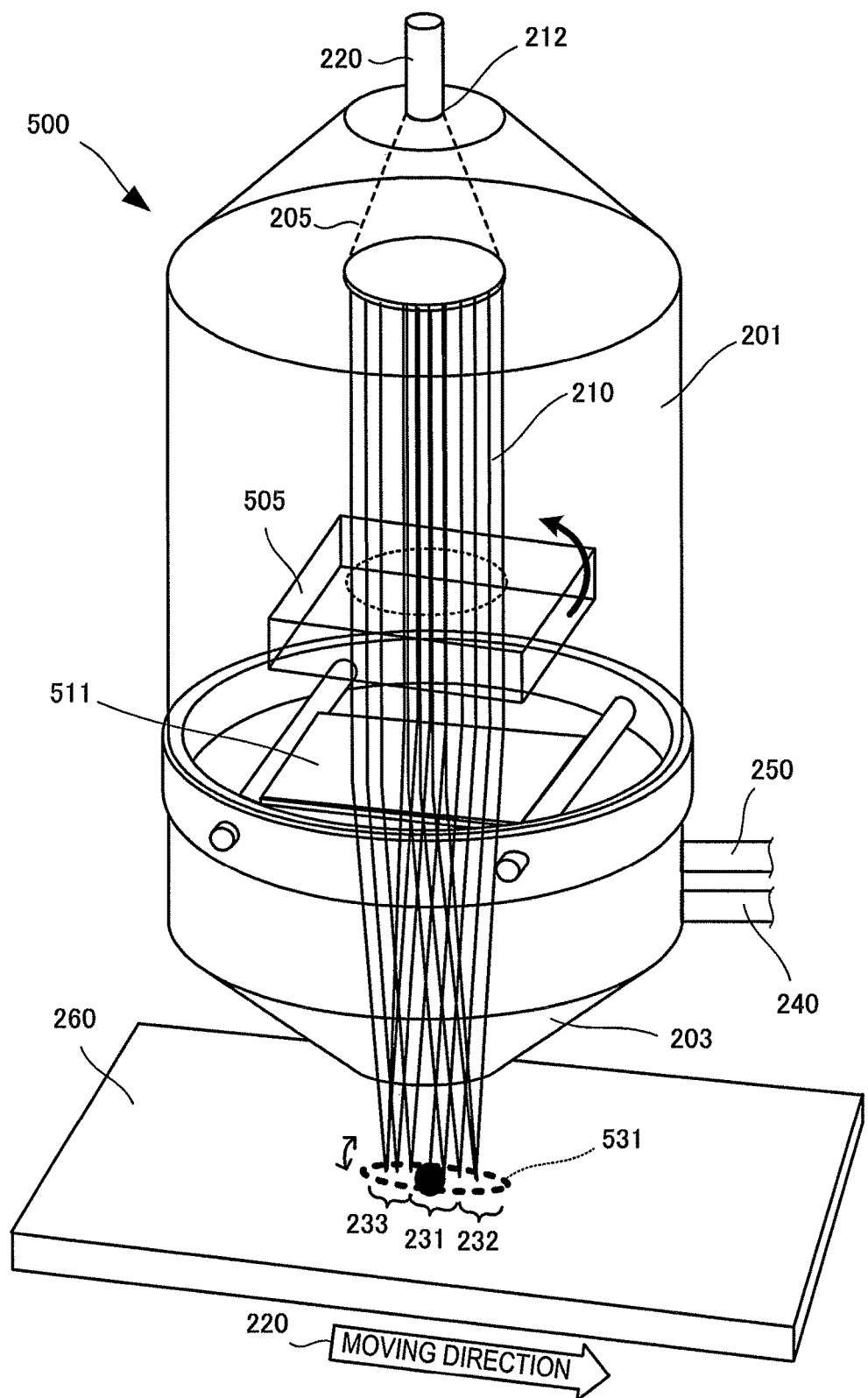
F I G. 5

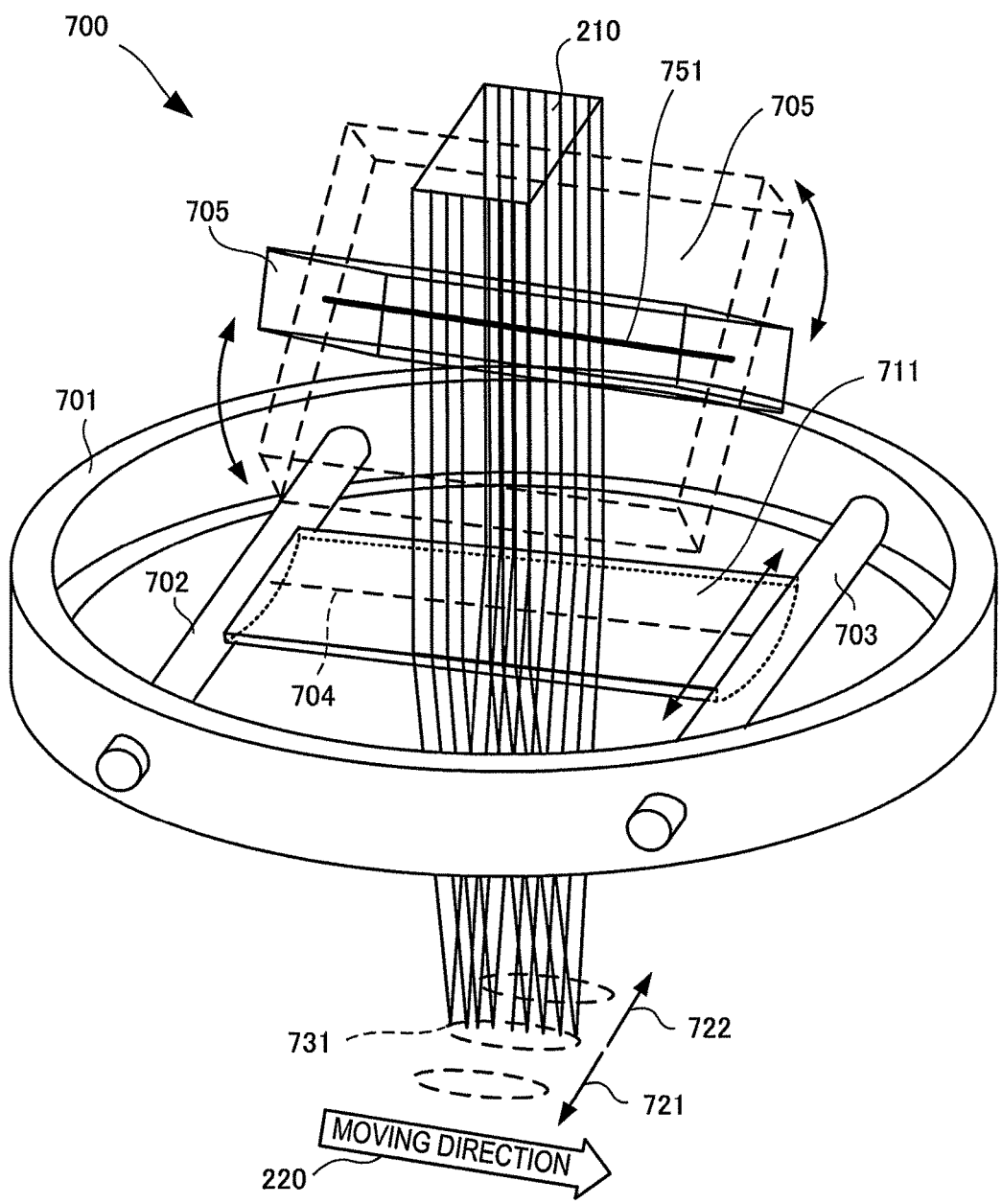
F I G. 7

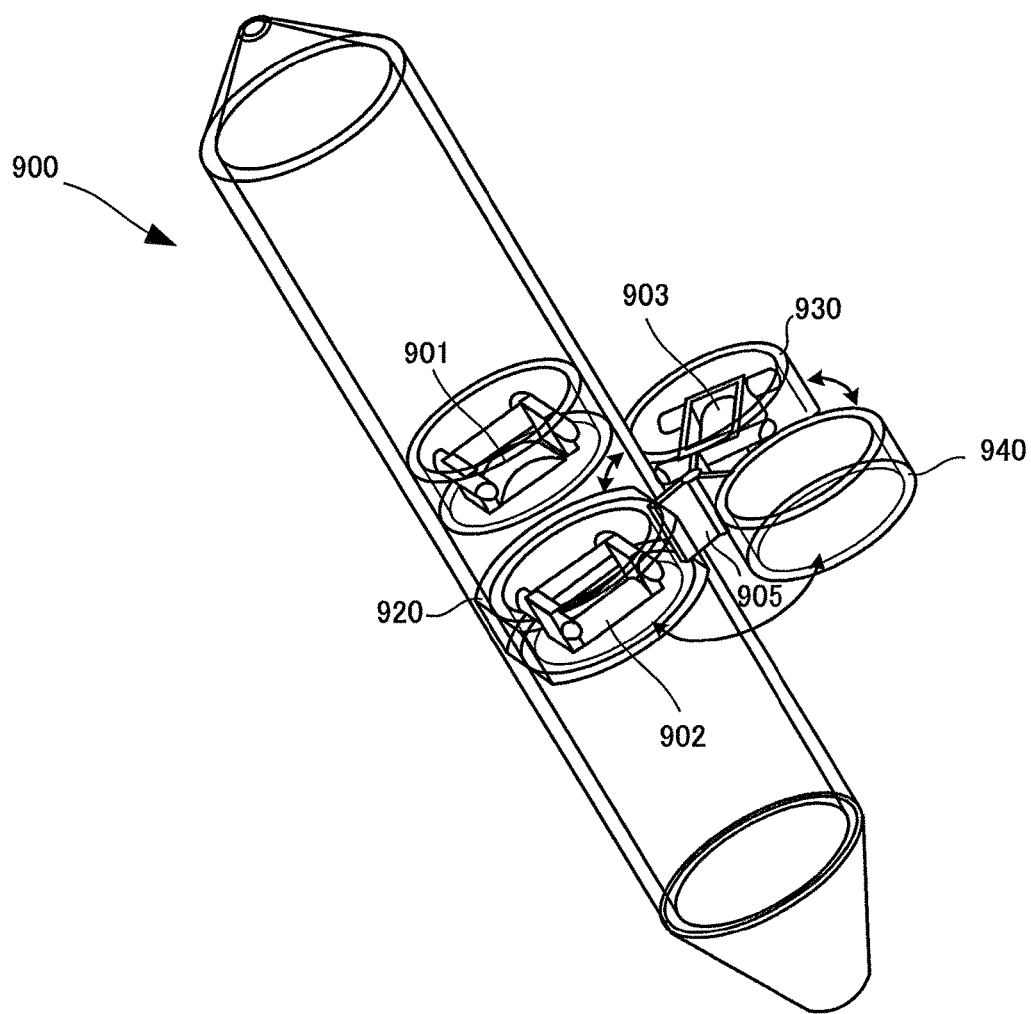
F I G. 9A

OPTICAL PROCESSING HEAD, OPTICAL MACHINING APPARATUS, AND OPTICAL PROCESSING METHOD

RELATED APPLICATION

This application is an application under 35 U.S.C. 371 of International Application No. PCT/JP2015/055483 filed on Feb. 25, 2015, the entire contents of which are incorporated herein by reference.

TECHNICAL FIELD

The present invention relates to an optical processing head, an optical machining apparatus, and an optical processing method.

BACKGROUND ART

In the above technical field, patent literature 1 discloses a laser machining apparatus in which a secondary laser for pre-heating is arranged to suppress the thermal stress at the time of machining and improve the shaping accuracy.

CITATION LIST

Patent Literature

Patent literature 1: U.S. Pat. No. 8,053,705

SUMMARY OF THE INVENTION

Technical Problem

In the technique described in this literature, a secondary light source is necessary and the apparatus is upsized.

The present invention enables to provide a technique of solving the above-described problem.

Solution to Problem

One aspect of the present invention provides an optical processing head that performs processing while moving, in a predetermined moving direction on a processing surface, an optical spot formed by condensing light emitted by a light source, comprising:

a first optical element that condenses light emitted by the light source to generate the optical spot of a shape elongated in the moving direction, wherein part of the optical spot is set as a processing region, and a front side and/or rear side of the processing region in the moving direction is set as a pre-heating region and/or post-heating region, and a processing target object before and/or after processing in the region is heated.

Another aspect of the present invention provides an optical machining apparatus comprising:

the optical processing head; a light source; and a light transmitting portion that transmits light emitted by said light source to said optical processing head.

Still other aspect of the present invention provides a method of controlling an optical processing head that performs processing while moving, on a processing surface, an optical spot formed by condensing light emitted by a light source, the optical processing head including an optical element that condenses light emitted by the light source to generate the optical spot of a shape elongated in one direction, the method comprising:

setting part of the optical spot as a processing region, setting a front side and/or rear side of the processing region in a moving direction as a pre-heating region and/or post-heating region, and pivoting the optical element in accordance with the moving direction of the optical spot to heat a processing target object before and/or after processing in the region.

Still other aspect of the present invention provides a program of controlling an optical processing head that performs processing while moving, on a processing surface, an optical spot formed by condensing light emitted by a light source, the optical processing head including an optical element that condenses light emitted by the light source to generate the optical spot of a shape elongated in one direction, the program causing a computer to execute:

setting part of the optical spot as a processing region, setting a front side or rear side of the processing region in a moving direction as a pre-heating region or post-heating region, and pivoting the optical element in accordance with the moving direction of the optical spot to heat a processing target object before or after processing.

Advantageous Effects of Invention

According to the present invention, the apparatus can be downsized while increasing the optical processing accuracy.

BRIEF DESCRIPTION OF DRAWINGS

FIG. 2 is a view showing the overall arrangement of an optical processing head according to the second embodiment of the present invention;

FIG. 5 is a view showing the overall arrangement of an optical processing head according to the third embodiment of the present invention;

FIG. 7 is a view showing the overall arrangement of an optical processing head according to the fourth embodiment of the present invention;

FIG. 9A is a view showing the arrangement of the optical system of an optical processing head according to the fifth embodiment of the present invention;

DESCRIPTION OF THE EMBODIMENTS

A preferred embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise. In this specification, a "cylindrical lens" is a lens having a cylindrical side surface. A "toric lens" is a lens having the side surface of a curved cylinder which is a cylinder obtained by curving a right circular cylinder, that is, a cylinder having a curved central axis.

First Embodiment

Figure 1:
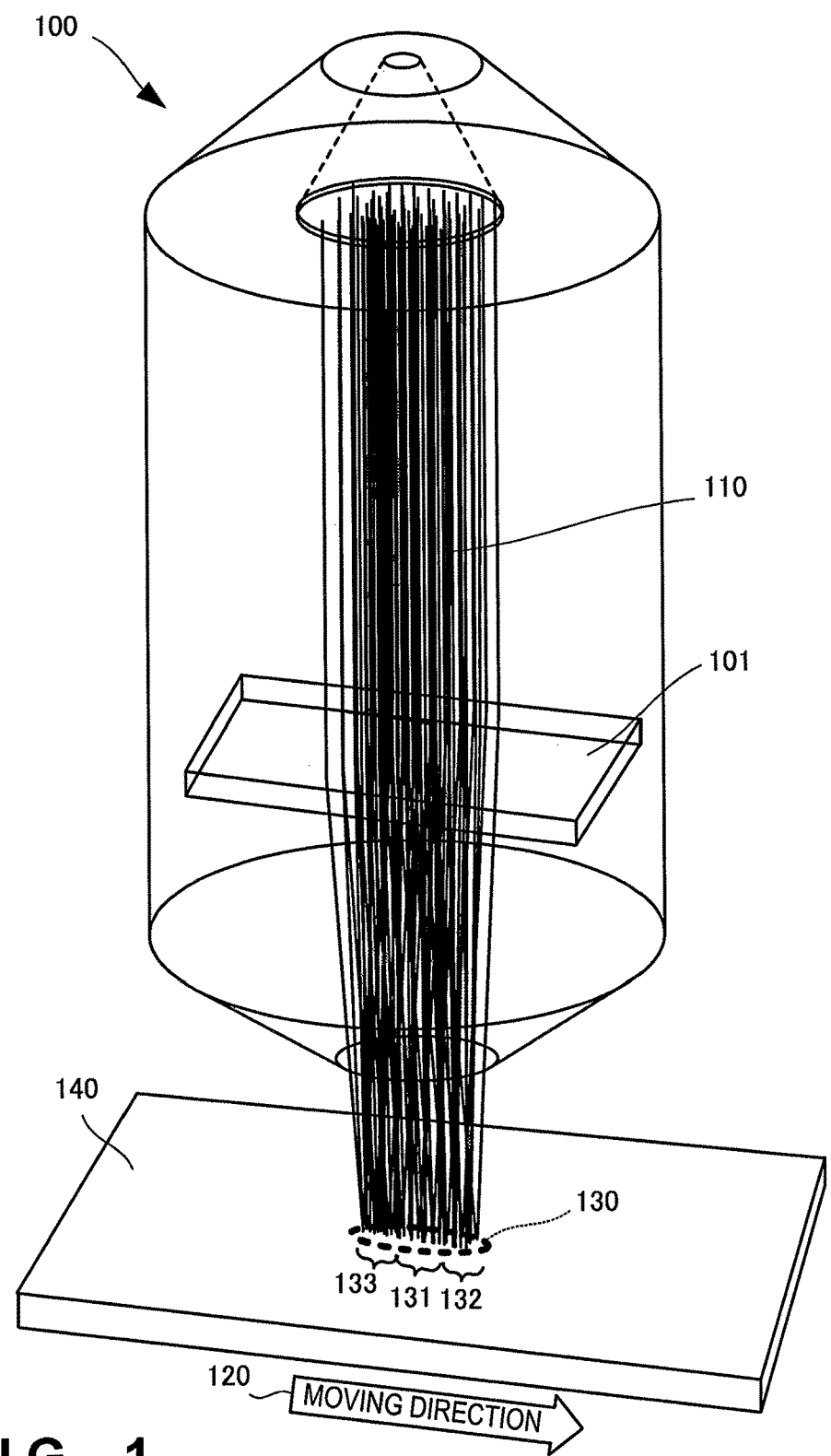
FIG. 1 is a view showing the arrangement of an optical processing head according to the first embodiment of the present invention.

An optical processing head according to the first embodiment of the present invention will be described with reference to FIG. 1. The optical processing head is an optical processing head 100 that processes, on a processing surface, an optical spot formed by condensing light emitted by a light source while moving the processing surface and the optical processing head relatively in a predetermined moving direction. The optical processing head 100 includes an optical element 101.

The optical element 101 condenses light 110 emitted by the light source, and generates an optical spot 130 of a shape expanded in a moving direction 120.

Part of the optical spot 130 is set as a processing region 131. The front side and/or rear side of the processing region 131 in the moving direction is set as a pre-heating region 132 and/or post-heating region 133, and a processing target object 140 before and/or after processing in the region is heated.

With this arrangement, no secondary laser need be newly used for pre-heating or post-heating. Pre-heating or post-heating is known as a measure for reducing the thermal stress and residual stress of a processing target object. With this arrangement, the apparatus can be downsized while increasing the optical processing accuracy.

Second Embodiment

An optical processing head 200 according to the second embodiment of the present invention will be described with reference to FIG. 2. FIG. 2 is a view showing the internal arrangement of the optical processing head 200. As shown in FIG. 2, the optical processing head 200 includes a condensing optical system device 201, an observation device 202, and a nozzle 203.

A beam 205 that has been emitted by a light source (not shown) and guided from an incident end 212 to the optical processing head 200 through a light transmission portion 220 passes through the inside of the optical processing head 200 and comes out to a processing surface 260.

The condensing optical system device 201 receives supply of a processing material and gas from a material supply device and gas supply device (neither is shown) through a material supply portion 250 and a gas supply portion 240, and ejects a material mixed in gas from the nozzle 203 to the processing surface 260. The material is, for example, a metal powder or a resin powder. The particle size is, for example, 0.001 to 1 mm. The material is ejected to be converged toward a processing region 231. At this time, the material convergent region on the processing surface 260 will be called a powder spot.

The optical processing head 200 forms a molten pool by absorbing and thermalizing light ejected onto the processing surface 260. The optical processing head 200 ejects a material from the nozzle 203 toward the molten pool, and builds up the material. The processing region 231 is a region where the material lands on the molten pool, that is, a powder spot.

By moving the optical processing head 200, or moving a processing target object, the position of the processing region 231 is moved on the processing surface 260 to perform processing into a desired shape. When the processing region 231 is regarded as the center, the front side in the moving direction serves as a pre-heating region 232, and the rear side in the moving direction serves as a post-heating region 233. Pre-heating raises the temperature of the processing region in advance to suppress an abrupt temperature rise of the processing region. This can reduce the thermal stress caused by an abrupt temperature rise, reduce a warp or deformation at the time of processing, and increase the processing accuracy.

To the contrary, post-heating warms the processing region after processing to suppress abrupt cooling. This can reduce the thermal stress caused by an abrupt temperature drop, reduce a warp or deformation at the time of processing, and increase the processing accuracy.

The observation device 202 is a device for observing the status of processing by the condensing optical system device 201, and includes an image capturing device 221 including an image sensor such as a CCD or CMOS sensor. Light traveling from the processing surface 260 is guided to the image capturing device 221 by a half mirror 222 arranged inside the condensing optical system device 201. By performing feedback control of processing parameters in accordance with the observed processing status, the processing accuracy can be improved.

<<Lens Arrangement>>

The light 205 emitted by the light source is converted into parallel light 210 through a lens 206 arranged inside the optical processing head 200. However, this optical element is not limited to the lens and is arbitrary as long as it converts light into the parallel light 210. An example of the optical element is a parabolic mirror. The optical processing head 200 includes a cylindrical lens 211 as an example of an optical element that condenses the parallel light 210 and generates an optical spot 230 of a shape elongated in a moving direction 270. The lens is smaller in loss than other kinds of optical elements and higher in energy efficiency. By coating the two surfaces of the lens with antireflection films, the reflection loss of light can be reduced to several % or less, and the energy efficiency can be further improved. Since the absorption loss of the lens is small, the temperature hardly rises, and the thermal lens effect by the temperature rise (change of the refractive index of the lens by heat and change of the lens shape) and degradation of the whole optical processing head 200 can be prevented. Since the parallel light 210 enters the cylindrical lens 211, the condensing performance can be improved and high-definition processing becomes possible. Letting A be the width of the condensed spot in the condensing direction, and δ be a small inclination (that is, a shift from the parallel) from the optical axis of the parallel light 210, $$A \propto \delta$$

is established based on Etendue theory. That is, A becomes smaller as δ becomes smaller. This produces an effect of improving the condensing performance as a beam entering the cylindrical lens 211 is light as parallel as possible.

The cylindrical lens 211 converts the parallel light 210 into the elliptical optical spot 230 on the processing surface 260. The optical spot 230 is not limited to the elliptical shape, and may have an arbitrary shape as long as the shape (elongated shape) is elongated in the moving direction of the processing region.

A toric lens may be used instead of the cylindrical lens 211. In this case, the light intensity can be changed within the condensing region, so the pre-heating temperature or post-heating temperature can be adjusted independently.

Figure 3:
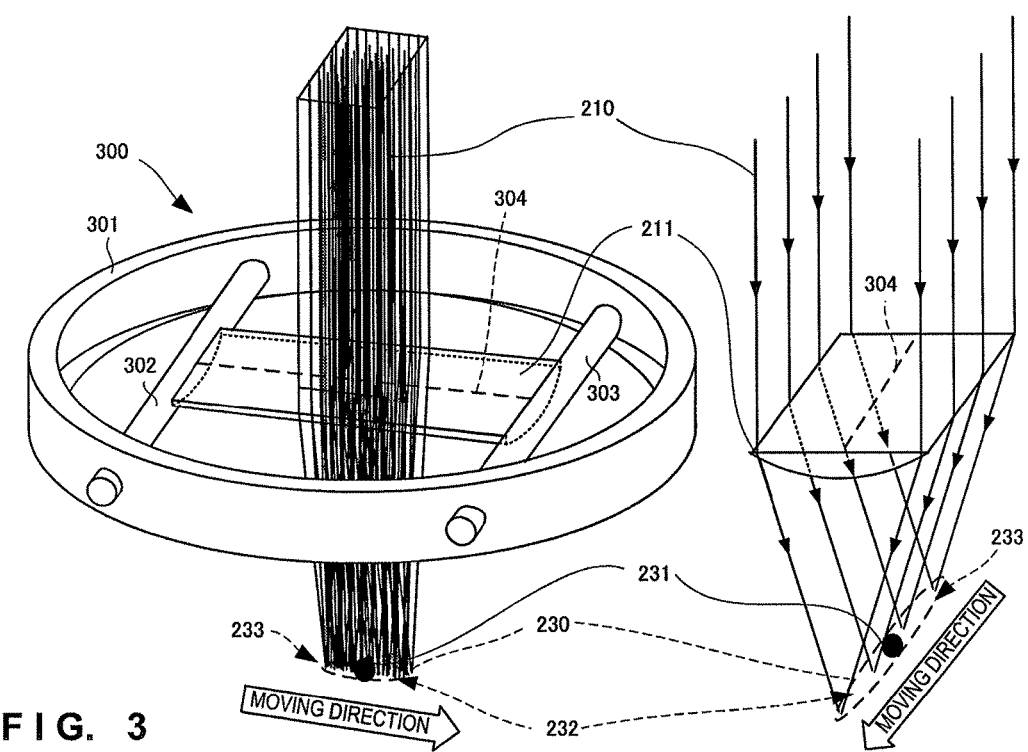
FIG. 3 is a view showing the arrangement of the optical system of the optical processing head according to the second embodiment of the present invention.

FIG. 3 is a view showing only a cylindrical lens unit 300 extracted to explain in detail the peripheral structure and operation of the cylindrical lens 211. The cylindrical lens unit 300 is assembled in the optical processing head 200.

In the cylindrical lens unit 300, the cylindrical lens 211 is clamped by two guides 302 and 303, and the guides 302 and 303 are fixed to a cylindrical portion 301. As shown in the right view of FIG. 3, the parallel light 210 having passed through the cylindrical lens 211 passes through a center line 304 of the cylindrical lens 211, is refracted toward a plane parallel to the parallel light 210, and forms an image (optical spot) of the elongated shape on the plane. Especially when the parallel light 210 has a circular section, its optical spot has an elliptical shape. That is, by directing the center line 304 to the moving direction of the optical spot on the processing surface, the optical spot 230 has an elliptical shape with a major axis in the moving direction.

Figure 4:
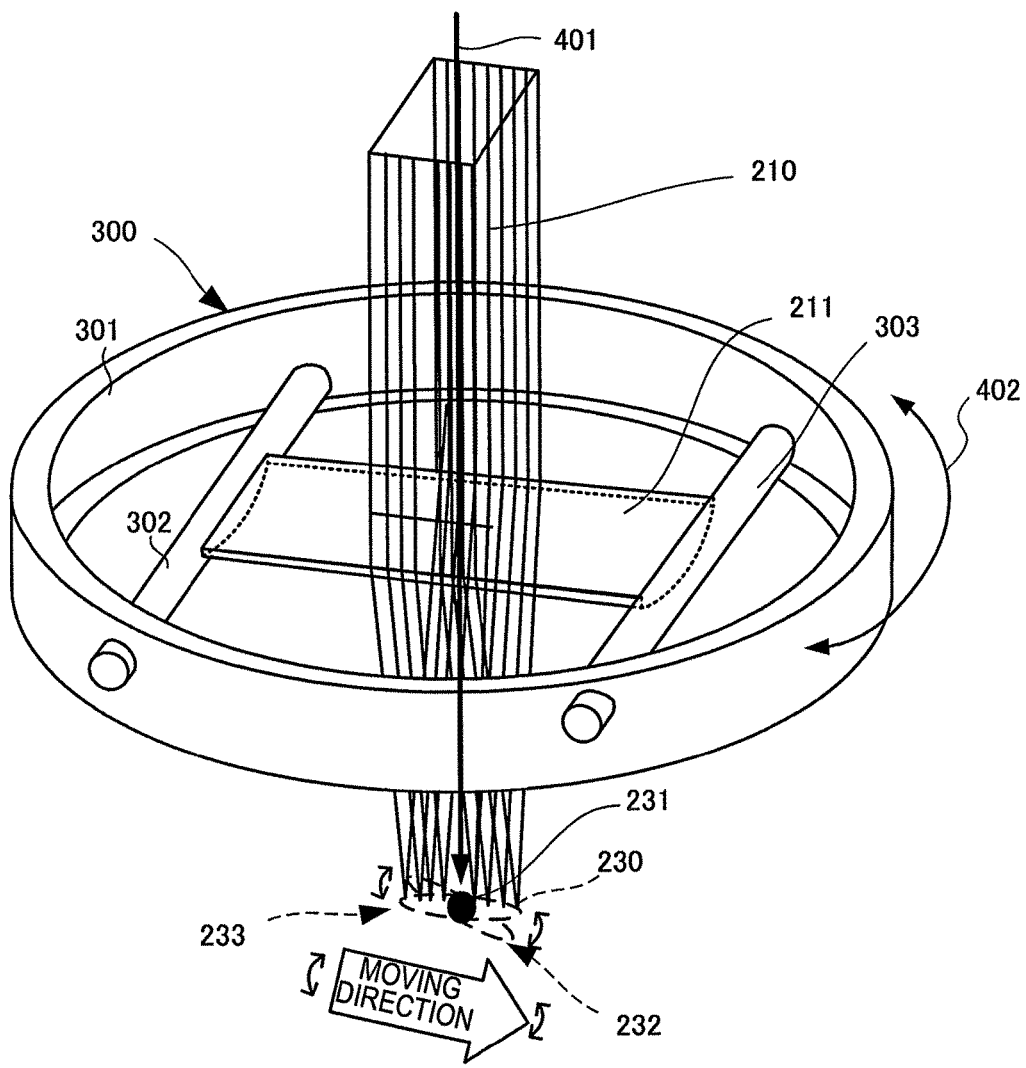
FIG. 4 is a view showing the operation of the optical system of the optical processing head according to the second embodiment of the present invention.

FIG. 4 is a view for explaining the pivot of the cylindrical lens 211. The cylindrical lens unit 300 pivots about an optical axis 401 in a direction indicated by an arrow 402. When the processing region 231 needs to be moved in various directions on the processing surface, for example, when performing lamination processing along the circle, the cylindrical lens unit 300 is pivoted in accordance with a change of the moving direction. More specifically, the orientation of the optical spot 230 can be changed following a change of the moving direction by pivoting the cylindrical lens 211 on a plane perpendicular to the optical axis 401 of the parallel light 210. That is, the positions of the pre-heating region 232 and post-heating region 233 can follow the moving direction. Although a pivot unit is not shown, for example, a motor and gears are used to pivot the cylindrical lens unit 300.

As described above, according to this embodiment, no secondary laser for pre-heating or post-heating need be arranged, so the whole apparatus can be downsized. Along with the downsizing, the number of components and the cost can be reduced, and the lead time of apparatus manufacturing can be shortened. Further, the pre-heating and post-heating positions can also be changed in accordance with the moving direction of the processing region on the processing surface, and high-quality processing can be implemented.

Although this embodiment uses the cylindrical lens 211 as an example of the optical element, the present invention is not limited to this and a toric lens may also be used instead. The toric lens can be used to adjust the heat distribution of the processing region 231, pre-heating region 232, and post-heating region 233. For example, a larger amount of heat can be generated for the processing region 231.

Third Embodiment

Figure 6:
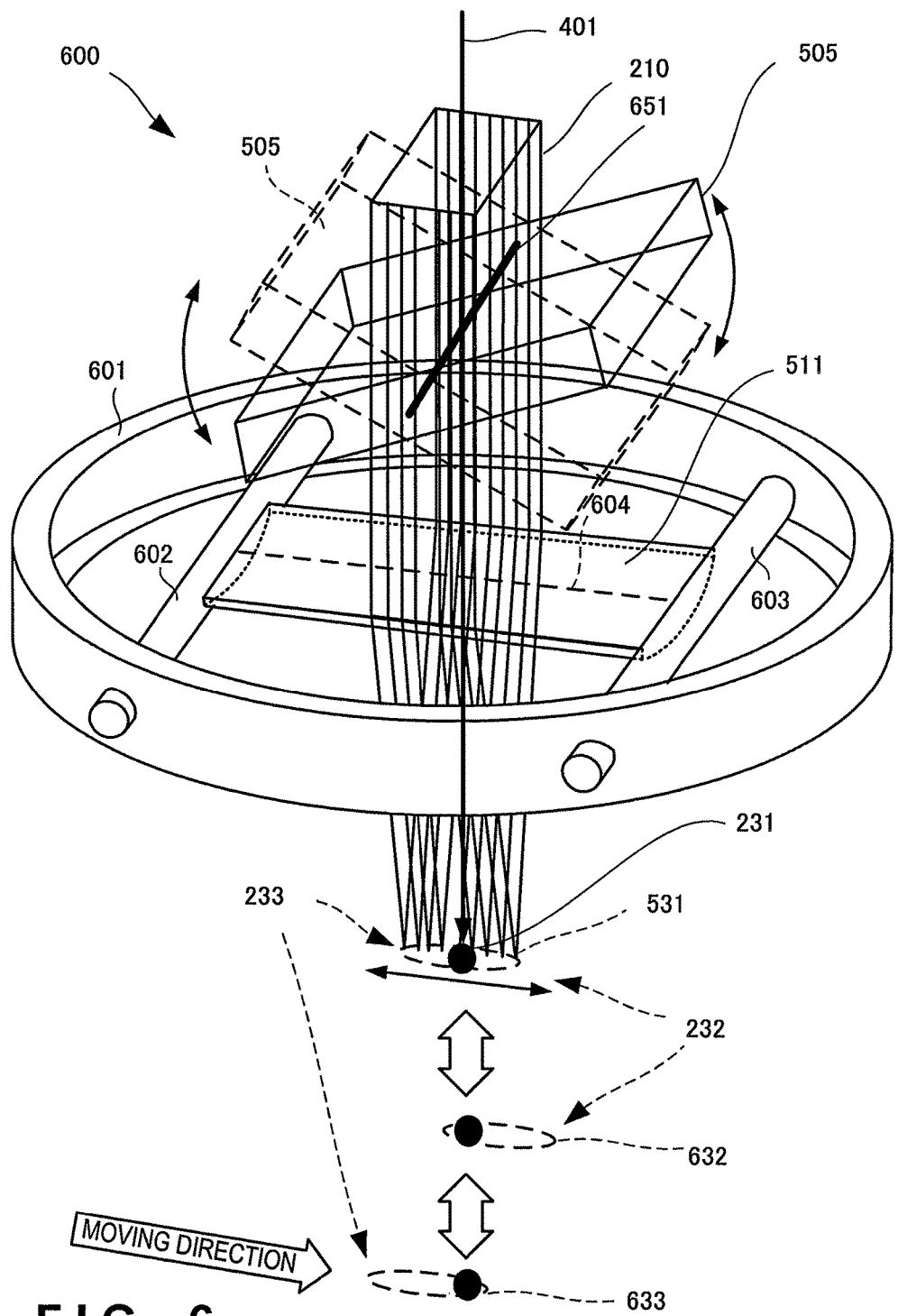
FIG. 6 is a view showing the overall arrangement of the optical processing head according to the third embodiment of the present invention.

An optical processing head 500 according to the third embodiment of the present invention will be described with reference to FIGS. 5 and 6. FIG. 5 is a perspective view for explaining the internal arrangement of the optical processing head 500 according to this embodiment. FIG. 6 is an enlarged perspective view for explaining the arrangement and operation of a cylindrical lens unit 600 according to this embodiment. The optical processing head 500 according to the third embodiment is different from the optical processing head according to the second embodiment in that the optical processing head 500 includes a transparent plate 505 which is arranged on the light source side with respect to a cylindrical lens 511 and transmits parallel light 210 entering the cylindrical lens 511, and an inclination portion (not shown) which changes an angle formed by the parallel light 210 and the transparent plate 505 in order to refract the parallel light 210. The remaining arrangement and operation are the same as those in the second embodiment, so the same reference numerals denote the same arrangement and operation and a detailed description thereof will not be repeated.

The transparent plate 505 includes antireflection films on the two surfaces against the parallel light 210. As shown in FIG. 5, the transparent plate 505 can be arranged to make the normal direction of the transmitting surface of the transparent plate 505 coincide with the direction of the parallel light 210. In this case, there is a reflection loss of 1 to 2% by the transparent plate 505, but the optical spot is not influenced.

The transparent plate 505 includes a pivot shaft 651 perpendicular to a plane including a center line 604 of the cylindrical lens 511 and an optical axis 401 of the parallel light 210. The transparent plate 505 pivots about the pivot shaft 651.

When the transparent plate 505 exists at a position perpendicular to the parallel light 210, as shown in FIG. 5, that is, when the optical axis direction and the normal direction of the transmitting surface coincide with each other, an optical spot 531 includes a powder spot, that is, a processing region 231 at the center of the optical spot 531. At this time, a pre-heating region 232 and a post-heating region 233 can be generated simultaneously.

When the transparent plate 505 pivots about the pivot shaft 651 counterclockwise in FIG. 6 and the front side in the moving direction comes to an upper position (position at a predetermined angle (for example, 10°) with respect to the state in FIG. 5), as indicated by a solid line in FIG. 6, an optical spot 632 includes the powder spot, that is, the processing region 231 at the rear end of the optical spot 632. At this time, only the pre-heating region 232 can be formed to be large.

In contrast, when the transparent plate 505 pivots about the pivot shaft 651 clockwise in FIG. 6 and the rear side in the moving direction comes to an upper position (position at a predetermined angle (for example, −10°) with respect to the state in FIG. 5), as indicated by a dotted line in FIG. 6, an optical spot 633 includes the powder spot, that is, the processing region 231 at the front end of the optical spot 633. At this time, only the post-heating region 233 can be formed to be large.

Fourth Embodiment

Figure 8:
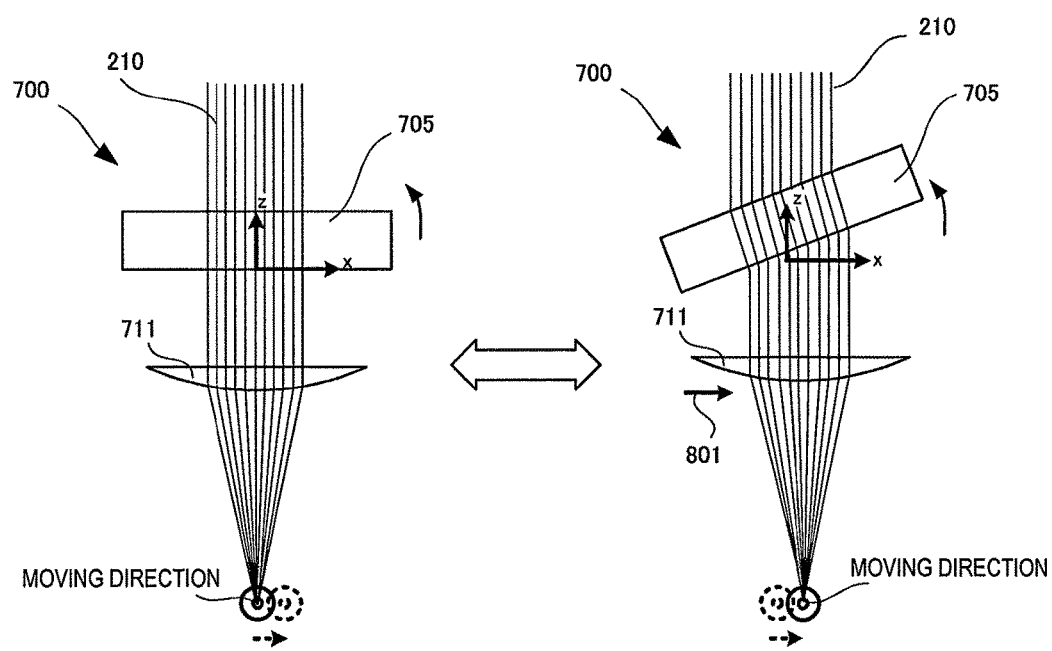
FIG. 8 is a view showing the arrangement of the optical system of the optical processing head according to the fourth embodiment of the present invention.

An optical processing head according to the fourth embodiment of the present invention will be described with reference to FIGS. 7 and 8. FIG. 7 is an enlarged perspective view for explaining the arrangement and operation of a cylindrical lens unit 700 according to this embodiment. FIG. 8 is a schematic view for explaining the operation of the cylindrical lens unit 700. The optical processing head according to the fourth embodiment is different from the optical processing head according to the second embodiment in that the optical processing head includes a transparent plate 705 which is arranged on the light source side with respect to a cylindrical lens 711 and transmits parallel light 210 entering the cylindrical lens 711. Further, the optical processing head according to this embodiment includes even an inclination portion (not shown) which changes an angle formed by the parallel light 210 and the transparent plate 705 in order to refract the parallel light 210. The remaining arrangement and operation are the same as those in the second embodiment, so the same reference numerals denote the same arrangement and operation and a detailed description thereof will not be repeated.

The transparent plate 705 according to the fourth embodiment pivots similarly to the transparent plate 505 according to the third embodiment, but the direction is different. In this embodiment, the transparent plate 705 pivots about a pivot shaft 751 parallel to a center line 704 of the cylindrical lens 711.

When the transparent plate 705 pivots about the pivot shaft 751 and the right side (near side in FIG. 7) in the moving direction comes to an upper position (position at a predetermined angle (for example, 10°) with respect to the state in FIG. 5), as indicated by a solid line in FIG. 7, an optical spot 731 moves in a direction 721 perpendicular to a moving direction 220, that is, toward the near side in FIG. 7.

To the contrary, when the transparent plate 705 pivots about the pivot shaft 751 and the left side (far side in FIG. 7) in the moving direction comes to an upper position (position at a predetermined angle (for example, −10°) with respect to the state in FIG. 5), as indicated by a dotted line in FIG. 7, the optical spot 731 moves in a direction 722 perpendicular to the moving direction 220, that is, toward the far side in FIG. 7.

That is, the position of the processing region can be finely adjusted in a direction perpendicular to the moving direction 220. Particularly when the processing region moves in a curve, whether to process the processing region inside the curve or to process it outside the curve can be selected.

When the transparent plate 705 is inclined, as shown in FIG. 7, the optical axis position shifts in the far/near direction. Thus, the cylindrical lens 711 is slid in a direction 801 perpendicular to the moving direction in accordance with a change of the angle of the transparent plate 705, as shown in FIG. 8. More specifically, guides 702 and 703 shown in FIG. 7 support the cylindrical lens 711 so that it can be slid.

As described above, pre-heating or post-heating can be performed during processing or both of them can be performed simultaneously. Further, the position of the processing region can be finely adjusted in a direction different from the moving direction. This improves the processing quality and accuracy.

Fifth Embodiment

Figure 9B:
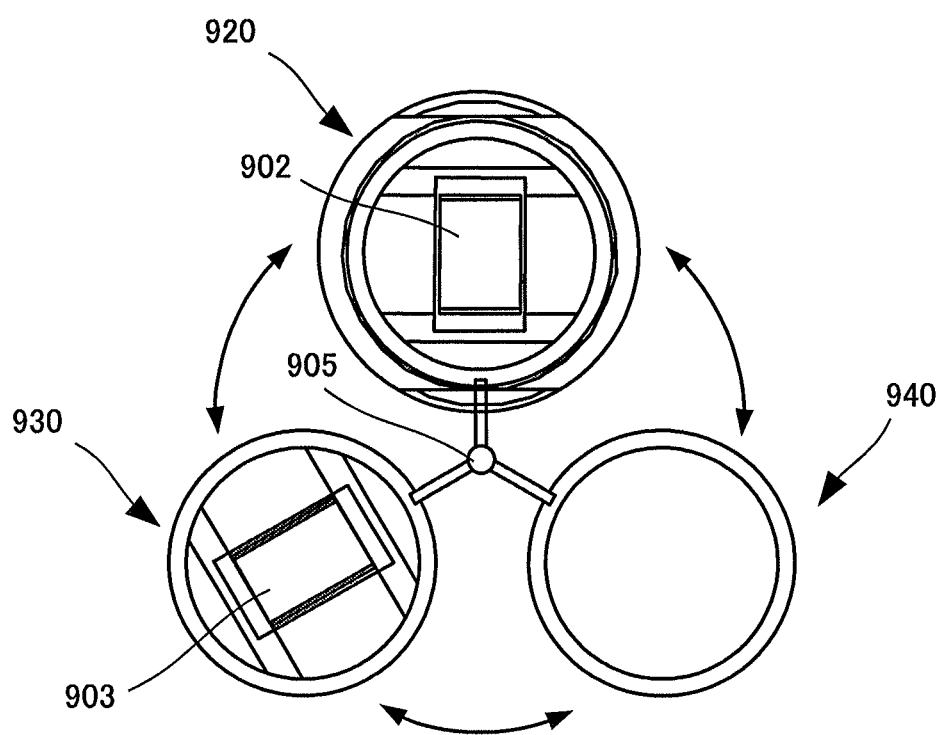
FIG. 9B is a view showing the arrangement of the optical system of the optical processing head according to the fifth embodiment of the present invention.

An optical processing head according to the fifth embodiment of the present invention will be described with reference to FIGS. 9A and 9B. FIG. 9A is a perspective view for explaining the arrangement of an optical processing head 900 according to this embodiment. FIG. 9B is a plan view for explaining an arrangement that implements exchange of a cylindrical lens unit.

Unlike the second embodiment, the optical processing head 900 according to the fifth embodiment includes a plurality of different types of cylindrical lens units, and a mechanism that exchanges these cylindrical lens units. The remaining arrangement and operation are the same as those in the second embodiment, so the same reference numerals denote the same arrangement and operation and a detailed description thereof will not be repeated.

A cylindrical lens 901 has the same arrangement as that of the cylindrical lenses 211, 511, and 711 according to the second, third, and fourth embodiments, and is arranged inside the optical processing head 900. A cylindrical lens 902 can be moved to the outside of the optical processing head 900 by a rotation mechanism 905. A cylindrical lens 903 is fixed to the same rotation mechanism 905, and the cylindrical lenses 902 and 903 are exchangeable. Further, a cylindrical portion 940 having no cylindrical lens is fixed to the rotation mechanism 905. More specifically, cylindrical lens units 920 and 930 respectively including the cylindrical lenses 902 and 903 are also exchangeable with the cylindrical portion 940 having no cylindrical lens.

When the rotation mechanism 905 rotates, the optical processing head can take three forms, that is, an arrangement in which only the cylindrical lens 901 exists on the optical axis, an arrangement in which the cylindrical lenses 901 and 902 exist on the optical axis, and an arrangement in which the cylindrical lenses 901 and 903 exist on the optical axis.

As described above, the cylindrical lens 901 converts parallel light into an elliptical optical spot on the processing surface. The aspect ratio of the ellipse can be decreased by combining the cylindrical lens 901 with the cylindrical lens 902 having a center line in a different direction. Further, the reduction ratio of the aspect ratio can be adjusted by combining the cylindrical lens 901 with the cylindrical lens 903 having a different curvature. The minimum value of the aspect ratio is 1, and the optical spot becomes a circle at this time.

As in the third and fourth embodiments, a transparent plate may be arranged upstream of the cylindrical lens 901. By holding the transparent plate by an inclination mechanism and holding the inclination mechanism by a pivot mechanism, the position of an optical spot and the ratio of pre-heating and post-heating can be freely adjusted, as in the third and fourth embodiments.

As described above, according to the fifth embodiment, an optical spot can be changed into a circle or an ellipse, and an optical spot can be selected in accordance with processing. With this selectivity, processing can be optimized, improving the processing accuracy.

Sixth Embodiment

Figure 10:
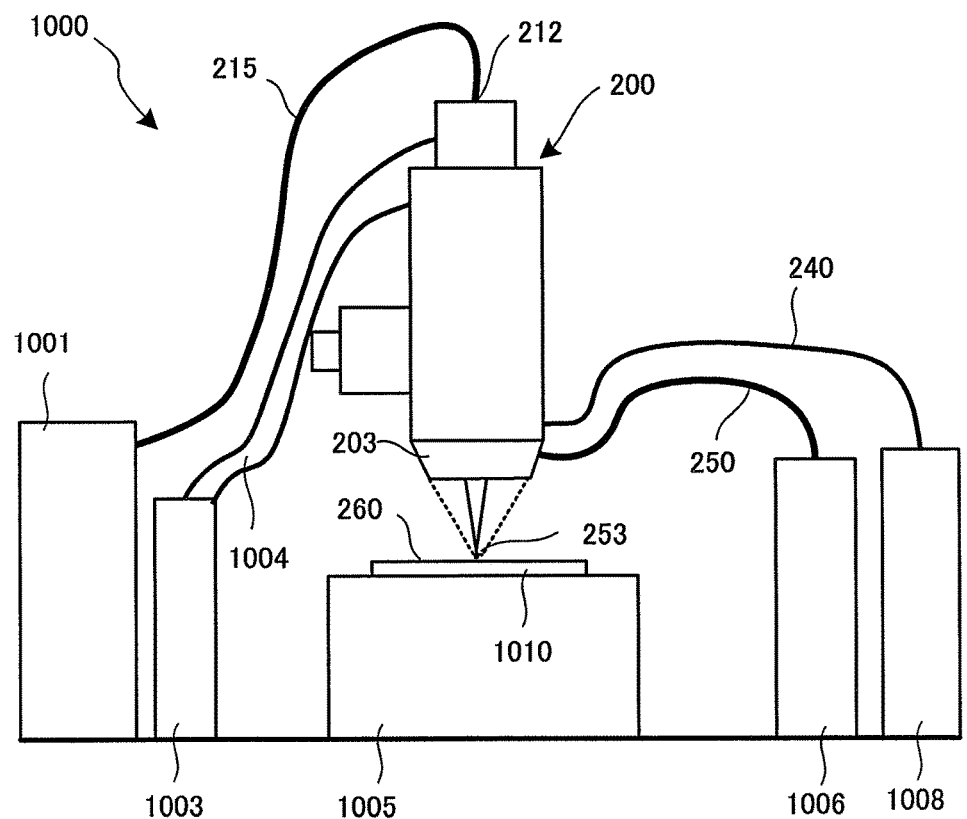
FIG. 10 is a view showing the overall arrangement of an optical machining apparatus according to the sixth embodiment of the present invention.

An optical machining apparatus 1000 according to the sixth embodiment of the present invention will be described with reference to FIG. 10. The optical machining apparatus 1000 is an apparatus that includes one of the optical processing heads 100, 200, 500, and 900 explained in the above-described embodiments, and generates a three-dimensional shaped object (or overlay welding) by melting a material by heat generated by condensed light. Here, the optical machining apparatus 1000 including an optical processing head 200 will be explained as an example.

<<Apparatus Arrangement>>

In addition to the optical processing head 200, the optical machining apparatus 1000 includes a light source 1001, a light transmitting portion 215, a coolant supply device 1003, a coolant supply portion 1004, a stage 1005, a material storage device 1006, a material supply portion 250, a gas supply device 1008, and a gas supply portion 240.

The light source 1001 can be a laser source, an LED, a halogen lamp, a xenon lamp, or the like. The wavelength of a beam is, for example, 1,060 nm in the case of the laser source. However, the wavelength is not limited to this and light is arbitrary as long as it is absorbed by a processing surface 260.

The light transmitting portion 215 is, for example, an optical fiber having a core diameter of φ0.01 to 1 mm, and guides light generated by the light source 1001 to the optical processing head 200. The core diameter of the light transmitting portion 215 serves as the diameter of an incident end 212. The coolant supply device 1003 stores, for example, water as a coolant, and supplies the coolant by a pump to the coolant supply portion 1004.

The coolant supply portion 1004 is a resin or metal hose having an inner diameter of φ2 to 6. The coolant is supplied into the optical processing head 200, circulated inside it, and returned to the coolant supply device 1003, thereby suppressing the temperature rise of the optical processing head 200. The coolant supply amount is, for example, 1 to 10 L/min.

The stage 1005 is an X stage, an X-Y stage, or an X-Y-Z stage, and the X-, Y-, and Z-axes can be driven. The material storage device 1006 supplies a material-containing carrier gas to the optical processing head 200 via the material supply portion 250. The material is a particle such as a metal particle or a resin particle. The carrier gas is an inert gas and can be, for example, argon gas, nitrogen gas, or helium gas.

The material supply portion 250 is, for example, a resin or metal hose, and guides, to the optical processing head, a particulate flow prepared by mixing a material in a carrier gas. However, when the material is a wire, no carrier gas is necessary.

The gas supply device 1008 supplies a purge gas to the optical processing head 200 through the gas supply portion 240. The purge gas is, for example, nitrogen, argon, or helium. However, the purge gas is not limited to this and may also be another gas as long as the purge gas is an inert gas. The purge gas supplied to the optical processing head 200 is ejected from a nozzle 203 along the above-described beam.

Although not shown, the optical machining apparatus 1000 may include an orientation control mechanism and position control mechanism that control the orientation and position of the optical processing head 200. In this case, the orientation and position of the optical processing head 200 are changed to move a processing region on a processing surface. However, the present invention is not limited to this, and the processing region on the processing surface may be moved by changing the orientation and position of the stage 1005 while fixing the optical processing head 200.

<<Apparatus Operation>>

Next, the operation of the optical machining apparatus 1000 will be explained. A shaped object 1010 is created on the stage 1005. Light emitted by the optical processing head 200 is condensed to the processing surface 260 on the shaped object 1010. The temperature of the processing surface 260 is raised by the condensed light, and the processing surface 260 is melted, partially forming a molten pool.

The material is ejected from the nozzle 203 to the molten pool of the processing surface 260. The material is melted into the molten pool. After that, the molten pool is cooled and hardened to deposit the material on the processing surface 260, implementing three-dimensional shaping.

The purge gas is ejected from the nozzle 203 to the processing surface 260. Thus, the peripheral environment of the molten pool is purged by the purge gas. By selecting an oxygen-free inert gas as the purge gas, oxidization of the processing surface 260 can be prevented.

The optical processing head 200 is cooled by the coolant supplied from the coolant supply device 1003 through the coolant supply portion 1004, suppressing the temperature rise during processing.

By moving the optical processing head 200 along the processing surface 260 at the same time as the above-described series of operations, desired shaping can be performed while depositing the material. That is, this apparatus can implement overlay welding or three-dimensional shaping.

Other Embodiments

The present invention has been described above with reference to the embodiments. However, the present invention is not limited to those embodiments. Various changes understandable by those skilled in the art within the scope of the present invention can be made for the arrangements and details of the present invention. The present invention also incorporates a system or apparatus that somehow combines different features included in the respective embodiments. Further, the present invention is also applicable even when a control program for implementing the functions of the embodiments is supplied to the system or apparatus directly or from a remote site. Hence, the present invention also incorporates the program installed in a computer to implement the functions of the present invention on the computer, a medium storing the program, and a WWW (World Wide Web) server that causes a user to download the program. Especially, a non-transitory computer readable medium storing a program for causing a computer to execute processing steps included in the above-described embodiments falls within the scope of the present invention.

The invention claimed is:

1. An optical processing head that performs processing while moving, in a predetermined moving direction, an optical spot formed on a processing surface made by deposited powder material by condensing light emitted by a light source, comprising a plurality of optical elements including:

a parallel light conversion element that converts the light emitted by the light source and exited from an incident end of an optical fiber having a first diameter to a parallel light in a circle shape having a second diameter;

a first optical element which is a cylindrical lens or a toric lens that condenses the parallel light received from the parallel light conversion element in a direction perpendicular to the moving direction and forms the optical spot in an elliptical shape with a major axis in the moving direction, and a transparent plate that is arranged between the parallel light conversion element and said first optical element, receives the parallel light, refracts the parallel light, and exits the refracted parallel light to said first optical element, wherein the transparent plate comprises a pivot shaft on a plane perpendicular to an optical axis of the parallel light, about which the transparent plate pivots to change an angle formed by the parallel light and said transparent plate, to refract and shift the parallel light, and to move the optical spot in a direction perpendicular to the moving direction, wherein a part of the optical spot is set as a processing region, which corresponds to a material convergent region on which the optical processing head is configured to deposit the powder material as a powder spot, and wherein a front side of the optical spot from the processing region in the moving direction is set a pre-heating region to reduce a thermal stress caused by an abrupt temperature rise of a processing target object by heating the processing target object before processing in the processing region, and a rear side of the optical soot from the processing region in the moving direction is set a post-heating region to reduce a residual stress caused by an abrupt temperature drop of the processing target object by heating the processing target object after processing in the processing region.

2. The optical processing head according to claim 1, wherein said first optical element pivots on a plane perpendicular to the optical axis of the parallel light to change the shape of the optical spot following a change of the moving direction.

3. A method of controlling the optical processing head according to claim 2, the method comprising the steps of:
   pivoting the first optical element on the plane perpendicular to the optical axis of the parallel light in accordance with the moving direction of the optical spot to heat a processing target object before and after processing in the processing region; and
   pivoting the transparent plate with the pivot shaft as an axis to move the optical spot onto the processing region in a direction perpendicular to the moving direction by refracting the parallel light through the transparent plate.

4. A non-transitory computer-readable medium storing a program which, when executed by a computer, causes the computer to perform a method of controlling the optical processing head according to claim 2, method comprising the steps of:
   pivoting the first optical element on the plane perpendicular to the optical axis of the parallel light in accordance with the moving direction of the optical spot to heat a processing target object before and after processing in the processing region; and
   pivoting the transparent plate with the pivot shaft as an axis to move the optical spot onto the processing region in a direction perpendicular to the moving direction by refracting the parallel light through the transparent plate.

5. The optical processing head according to claim 1, wherein said first optical element slides in a direction perpendicular to the moving direction in accordance with a movement of the parallel light in the direction perpendicular to the moving direction based on a change of the angle of said transparent plate.

6. The optical processing head according to claim 1, further comprising a second optical element selected from the group consisting of a cylindrical lens and a toric lens that further condenses light having passed through said first optical element.

7. An optical machining apparatus comprising:
   an optical processing head defined in claim 1;
   a light source; and
   a light transmitting portion that transmits light emitted by said light source to said optical processing head.

8. The optical processing head according to claim 1, wherein an input angle of the parallel light to the transparent plate is identical to an output angle of the parallel light from the transparent plate.

9. The optical processing head according to claim 1, wherein the first optical element is disposed closer to the processing surface than any other optical element in the optical processing head.

\* \* \* \* \*